Dec. 27, 1960  B. E. GETZ  2,966,022
HAY CONDITIONER
Filed March 12, 1958  2 Sheets-Sheet 2
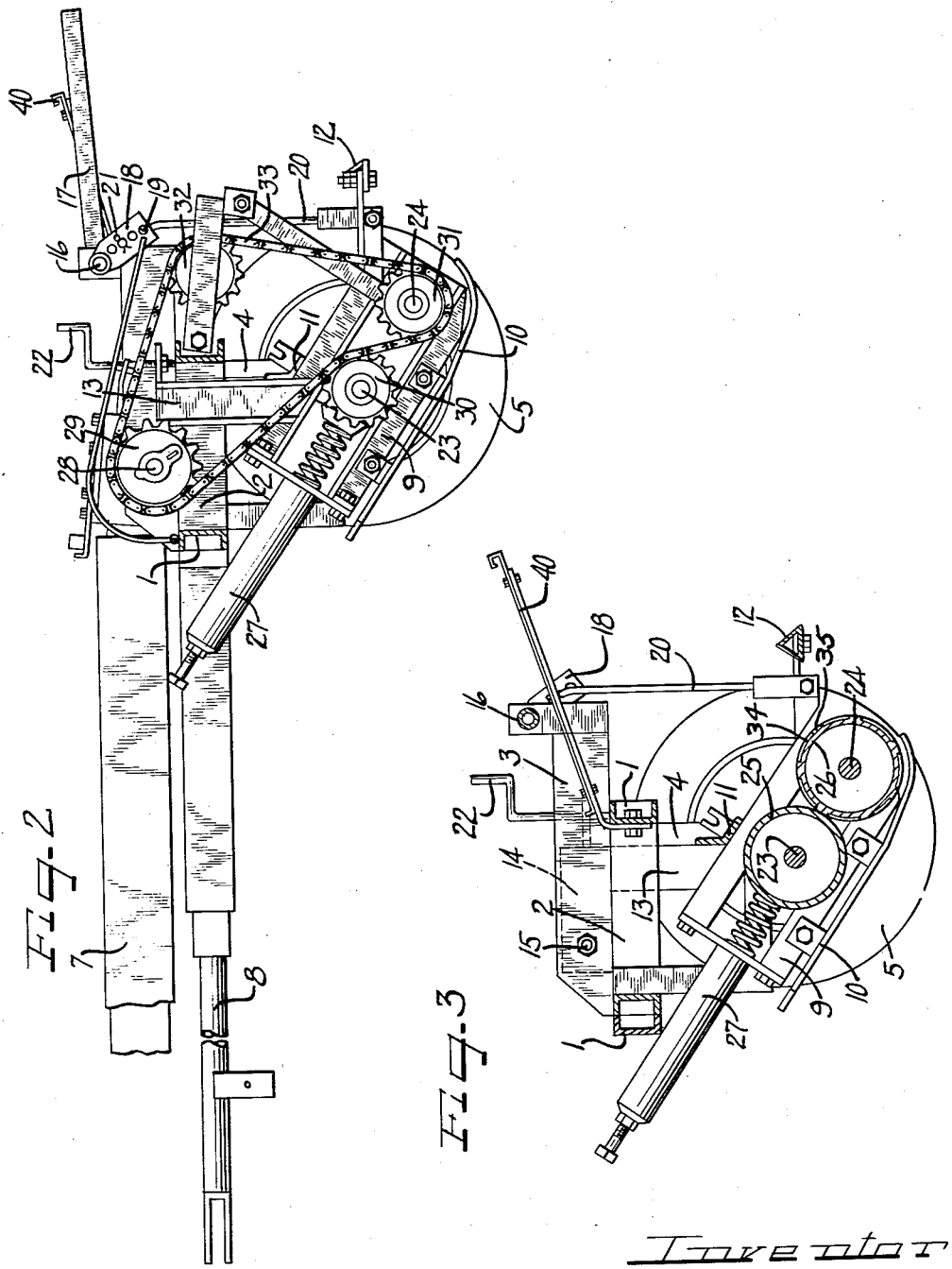
Inventor
Benjamin E. Getz
by Hill, Sherman, Meroni, Gross & Simpson Attys

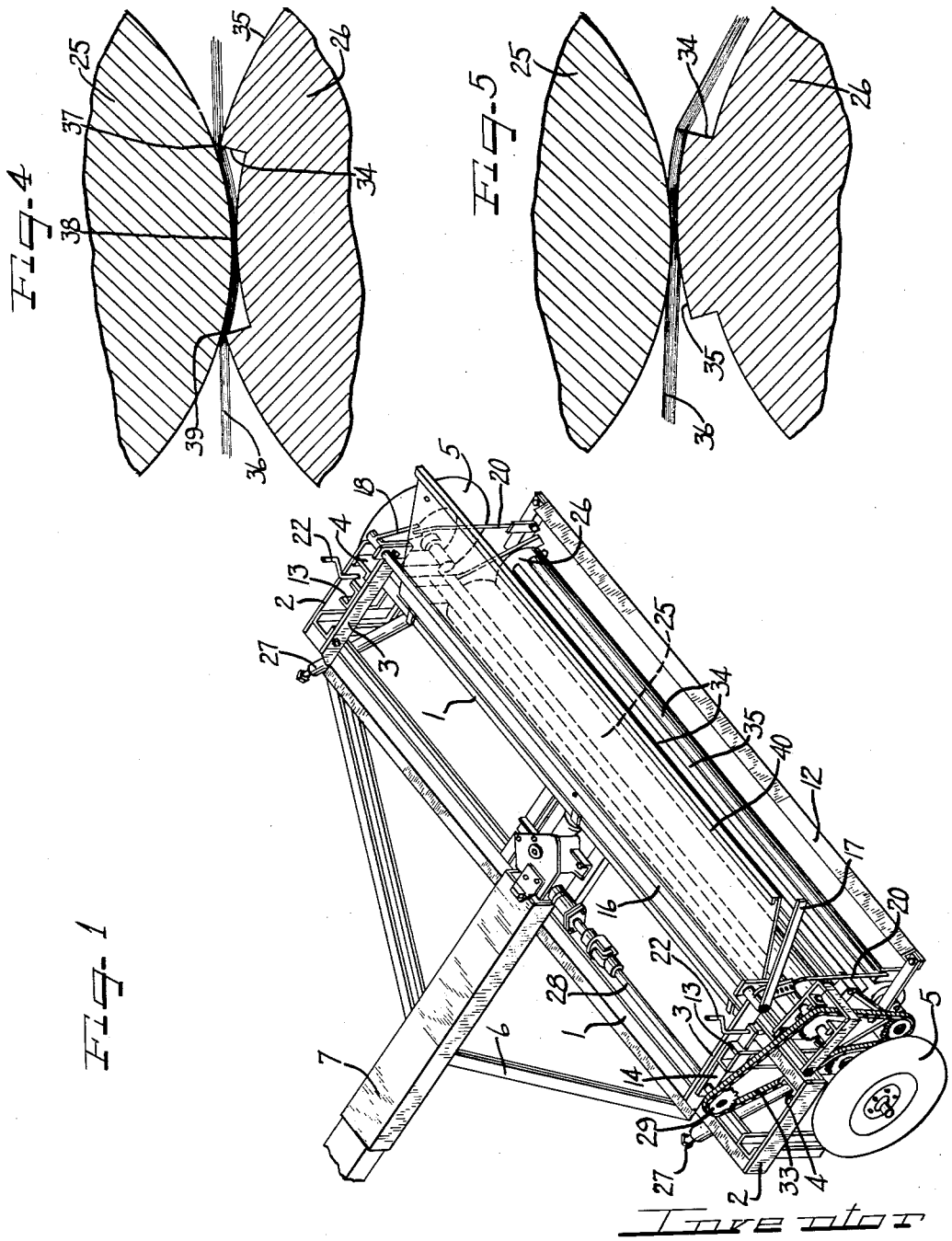

United States Patent Office 2,966,022
Patented Dec. 27, 1960

2,966,022

HAY CONDITIONER

Benjamin E. Getz, 252 W. Adams St., Morton, Ill.

Filed Mar. 12, 1958, Ser. No. 721,027

3 Claims. (Cl. 56—1)

This invention relates to improvements in a hay conditioner, and more particularly to an agricultural processing machine to act upon mowed crops, such as hay, alfalfa, certain grasses, and the like, although the invention may have other uses and purposes as will be apparent to one skilled in the art.

In the past, several types of agricultural processing machines have been developed with the function of picking up a mowed crop from the field, crushing the crop, and then redistributing the crushed crop lightly upon the ground, so that the field drying time of the crop will be very materially shortened. In fact, in most cases, the crop may be mowed, processed by a machine such as the instant invention, left to dry, and gathered all in the same day. Little risk is entailed, therefore, on the part of the farmer of the crop being damaged by a sudden rain or other natural phenomena by virtue of lying a lengthy time in the field to be sun dried or cured.

Among the machines heretofore developed for this purpose is that shown in my previously issued Patent No. 2,592,269 entitled "Agricultural Cutting and Processing Machine Assembly," dated April 8, 1952. However, the need has now arisen and in certain locations, such as a small farm or where a relatively light crop is to be harvested, preference is shown for a much lighter weight and more economical processing machine.

With these thoughts as well as others in mind, it is an important object of the instant invention to provide an extremely lightweight crop processing machine, capable of picking up, crushing, and lightly redistributing a crop in the field, and which requires a minimum of power to transport it over a field.

Another object of the instant invention is the provision of a crop processing machine embodying crushing rolls with the lower roll so constructed that it also acts to pick up a mowed crop from the ground as well as co-operate with the upper roll in crushing the picked-up crop, thereby eliminating an additional crop pick-up element commonly used heretofore on machines of this general character.

Another feature of the instant invention resides in the provision of a crop processing machine containing a pair of crushing rolls, with the lower roll disposed to the rear out of vertical alignment with the upper roll, and shaped so as to pick up mowed crop and deliver it directly to the bite between the rolls, thereby eliminating the need for shields or guide means to direct the crop between the rolls.

Still another feature of the instant invention resides in the provision of a crop processing machine including crushing rolls, which rolls are so shaped that the crop passing between them is kinked and crushed alternately.

Still a further object of the instant invention is the provision of a crop processing machine embodying a main frame to which the wheels are attached, and an auxiliary or sub-frame carrying the crushing rolls and being separately adjustable to regulate the height of the lower roll from the ground from the main frame.

It is also an object of this invention to provide a crop processing machine including a pair of crushing rolls, at least one of which is provided with relatively wide and shallow grooves extending lengthwise thereof, with cylindrical portions alternating with the grooves, and the other roller being of such diameter as to in effect contact the bottom of each groove.

While some of the more salient features, characteristics and advantages of the instant invention have been above pointed out, others will become apparent from the following disclosures, taken in conjunction with the accompanying drawings, in which Fig. 1 is a fragmentary rear plan perspective view of a crop processing machine embodying principles of the instant invention;

Fig. 2 is a fragmentary transverse vertical sectional view taken just inside the lefthand member of the main frame as the structure is seen in Fig. 1, and illustrating the drive arrangement;

Fig. 3 is a fragmentary transverse vertical sectional view taken in an intermediate portion of the machine;

Fig. 4 is a fragmentary greatly magnified sectional view of the crushing rolls, illustrating one phase of their operation; and Fig. 5 is a view similar in character to Fig. 4, but illustrating another phase of operation of the crushing rolls.

As shown on the drawings:

In the illustrated embodiment of the instant invention, there is shown a crop processing machine embodying a main frame comprising inter alia a pair of spaced transverse channels 1—1, outer longitudinal connecting members 2—2, inner longitudinal connecting members 3—3, and vertical end members 4—4, into which the wheels 5—5 are journaled, these wheels giving mobility to the entire device. Also incorporated with the main frame is a substantially triangular forwardly projecting portion 6, which supports a drawbar assembly 7 that may suitably be connected to any power source such as a tractor or the like, and also a power take-off assembly 8 (Fig. 2) which may be connected in any suitable manner with the power take-off means commonly provided on tractors and the like. This main frame is rigid, and remains in fixed position or relationship to the wheels 5—5, except for the rotation of the latter. In other words, the wheels are not raised or lowered relatively to the main frame in order to adjust the height of the crushing rolls to be later described in relation to the ground.

The structure also includes an auxiliary frame pivotally associated with the main frame. This auxiliary frame includes a pair of inclined rectangular frame assemblies 9—9, one being disposed at each side of the machine, as seen in Figs. 2 and 3. Each of these assemblies at the very side of the machine carries a skid bar 10 thereon, to prevent contact of the crushing rolls with uneven portions of the ground. The two frame assemblies 9—9 are connected across the machine by an elongated frame angle 11, and also by a tedder bar assembly 12 projecting to the rear of the machine. Each of the frame assemblies 9 is also connected by way of an upright channel 13 to a cross plate 14 which, in turn, is pivoted as at 15 to one of the longitudinal frame members 3, all as seen best in Fig. 3. A cross rod 16 extending substantially the width of the machine and pivoted to the main frame has a rearwardly extending handle 17 projecting from one end thereof, as seen in Figs. 1 and 2. A plate 18 having a series of apertures 19 therein is fixed to the cross rod or shaft 16 adjacent each end thereof, and connected to the sub-frame and each plate 18 is a vertically disposed link 20. This link has the upper end thereof turned and projected through a selected aperture 19, in which position it may be secured in any desired manner such as by a cotter pin 21 seen in Fig. 2.

The auxiliary frame may be selectively raised and lowered relatively to the main frame by the handle 17, and when in its lowermost position, gravity will hold it, but when in an upper position of adjustment, it may be retained by means of a pair of cranks 22—22 at each side of the machine, and each of which is threaded through a portion of the auxiliary frame to abut against a part of the main frame, as seen in Fig. 2.

The portions 9—9 of the auxiliary frame journal a pair of shafts 23 and 24 carrying cylindrical and preferably hollow crushing rolls 25 and 26 respectively. At each side of the machine, the upper crushing roll 25 is biased against the lower crushing roll 26 by means of an adjustable spring assembly 27 so as to provide proper contact and pressure between the rolls.

The rolls 25 and 26 are driven from the aforesaid power take-off assembly 8 by way of a transversely disposed shaft 28 (Fig. 1) which is connected to the power take-off assembly in the usual manner. At the outer end this shaft carries a sprocket 29, and sprockets 30 and 31 respectively are provided on the shafts for the rolls 25 and 26, as seen best in Fig. 2. An idler sprocket 32 is carried by a portion of the sub-frame in order to guide and balance a chain 33 trained over all the sprockets, and, from the showing in Fig. 2, the chain passes over the top of the sprocket 30 but underneath the sprocket 31 so the rolls will be rotated in opposite directions to properly feed the material to be crushed therebetween.

As stated above, the lower roll is relied upon to pick up mowed crop from the field and deliver that crop to the nip of the rolls. To this end, it will be noted that, as seen best in Fig. 3, the rolls are not in vertical alignment, but the lower roll is well to the rear of the upper roll. Preferably the lower roll is to the rear of the upper roll a distance at least half the diameter of a roll, and in the illustrated instance, that distance is better than ¾ the diameter of a roll.

Also, to enable the lower roll to pick up the crop and further to provide the alternate kinking and crushing of the crop hereinabove mentioned, the lower roll is provided on its surface with a plurality of spaced grooves extending longitudinally of the roll to points immediately adjacent the roll ends. These grooves, designated by numeral 34, are circumferentially separated by cylindrical portions 35 alternating with the grooves. The grooves are preferably cut into the surface of the hollow roll and each groove is bottomed as is seen clearly in Fig. 4. In other words, the groove is not a slot clear through the metal forming the roll. It is not essential that the rolls be of the same diameter, but it is preferable that each groove is of sufficient width to permit the upper roll to substantially contact the bottom of the groove, as seen in Fig. 4. With this arrangement, crop 36 passing between the rolls, assuming the lower roll is turning clockwise in Fig. 4, will be kinked at the leading edge of a groove 34 at the point 37, then crushed against the bottom of the groove at 38, then kinked at the trailing edge of the groove at 39, and then crushed over the cylindrical face 35, as seen in Fig. 5 until the next groove is reached. Thus, there is an alternate kinking and crushing of the crop throughout. This procedure results in the crushing and breaking of the stalks, and yet most of the juice and nutriment in those stalks are retained and brought to the surface of the stalks for quicker drying, whereby drying time of the crop in the sun and air is shortened to a great extent. Actually, the crop is more appetizing to cattle when processed in this manner than when merely left in the field to dry without any processing.

The operation of the instant invention is simple and effective. Owing to the lightness in weight of the machine set forth herein, only a small tractor is necessary to transport the machine through the field. As the machine moves forwardly, the rolls are driven from the power take-off of the tractor or other vehicle, and the lower roll picks up mowed crop from the ground, passes it directly into the nip of the rolls, and as it passes through the rolls it is alternately kinked and crushed. The crop is discharged from the rolls in a rearward and upward direction, and a shield 40 may extend rearwardly from the upper part of the main frame to direct the crop downwardly if it is thrown that high. The crop falls over the tedder bar 12 which causes it to be distributed lightly back on the field behind the machine. The structure is obviously economical to manufacture and use, is efficient, and highly durable.

It will be understood that modifications and variations may be effected without departing from the scope of the novel concepts of the present invention.

I claim as my invention:

1. In an agricultural processing machine to act upon mowed crop, mobile frame means, a pair of crushing rolls carried by said frame means and comprising an upper roll having a smooth cylindrical surface and a lower roll disposed adjacent the ground and having shallow-bottomed grooves extending substantially parallel to the longitudinal axis of said lower roll enabling said lower roll to pick up mowed crop from the ground and feed it between the rolls, said grooves being of sufficient width for the smooth surfaced upper roll to enter into each groove and crush crop against the bottom of each groove, and drive means operatively associated with said rolls.

2. In an agricultural processing machine to act upon mowed crop, mobile frame means, a pair of crushing rolls carried by said frame means and comprising an upper roll having a smooth surface and a lower roll disposed adjacent the ground and having shallow-bottomed grooves extending substantially parallel to the longitudinal axis of said lower roll to pick up mowed crop and feed it between said rolls, said upper and lower rolls defining therebetween a nip for crushing said crop, said grooves being of sufficient width to permit said upper roll to at least partially enter said grooves for crushing crop against the bottom of each of the grooves, whereby said upper and lower rolls cooperate to both kink and crush said crop, kinking of said crop occurring at both side edges of said grooves and crushing of said crop occurring between the rolls and against the bottom of the grooves, and drive means operatively associated with said rolls.

3. In an agricultural processing machine to act upon mowed crop, mobile frame means, a pair of crushing rolls carried by said frame means and comprising an upper roll having a smooth cylindrical surface and a lower roll disposed adjacent the ground and having shallow-bottomed grooves extending substantially parallel to the longitudinal axis of the bottom roll enabling said bottom roll to pick up mowed crop from the ground and feed it between said rolls, the grooves of said bottom roll being of sufficient width to cooperate with said upper roll to kink and crush crop between said rolls and against the bottom of the grooves, and drive means operatively associated with said rolls.

References Cited in the file of this patent

UNITED STATES PATENTS

| | | |
|---|---|---|
| 2,405,205 | Gordon et al. | Aug. 6, 1946 |
| 2,506,054 | Agee et al. | May 2, 1950 |
| 2,711,622 | Cunningham | June 28, 1955 |
| 2,753,788 | Getz | July 10, 1956 |
| 2,811,819 | Heth | Nov. 5, 1957 |
| 2,827,745 | Taylor | Mar. 25, 1958 |
| 2,829,481 | Jarvis | Apr. 8, 1958 |